US012399445B2

(12) United States Patent
Sato

(10) Patent No.: US 12,399,445 B2
(45) Date of Patent: Aug. 26, 2025

(54) IMAGE FORMING APPARATUS AND PAPER DUST CLEANING DEVICE

(71) Applicant: KYOCERA Document Solutions Inc., Osaka (JP)

(72) Inventor: Takehiro Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/600,057

(22) Filed: Mar. 8, 2024

(65) Prior Publication Data

US 2024/0302766 A1 Sep. 12, 2024

(30) Foreign Application Priority Data

Mar. 9, 2023 (JP) ................................ 2023-036431

(51) Int. Cl.
*G03G 15/02* (2006.01)
*G03G 15/16* (2006.01)

(52) U.S. Cl.
CPC ....... *G03G 15/0225* (2013.01); *G03G 15/161* (2013.01); *G03G 2215/00708* (2013.01)

(58) Field of Classification Search
CPC ............ G03G 15/0225; G03G 15/161; G03G 2215/00708; G03G 2221/0042; G03G 2221/0063; G03G 21/00
See application file for complete search history.

(56) References Cited

U.S. PATENT DOCUMENTS

2019/0146403 A1* 5/2019 Maeda ............... G03G 15/6529 399/357
2020/0012225 A1* 1/2020 Kamizato .............. G03G 21/00
2020/0379400 A1* 12/2020 Miyakoshi ............. G03G 21/00

FOREIGN PATENT DOCUMENTS

JP 2008287173 A 11/2008

* cited by examiner

*Primary Examiner* — Sandra Brase
(74) *Attorney, Agent, or Firm* — Alleman Hall & Tuttle LLP

(57) ABSTRACT

An image forming apparatus according to the present disclosure includes a paper dust cleaning device configured to remove paper dust adhered to a surface of a conveying roller that conveys a paper sheet in a predetermined conveying direction. The paper dust cleaning device includes a paper dust removing member configured to extend in an axial direction of the conveying roller and come in contact with a surface of the conveying roller; a holder formed in a long shape in the axial direction and configured to hold the paper dust removing member; and a holder support portion configured to hold the holder so that the paper dust removing member comes in contact with the surface of the conveying roller, and configured to support the holder so as to be movable in the axial direction.

7 Claims, 15 Drawing Sheets

IMAGE FORMING APPARATUS AND PAPER DUST CLEANING DEVICE

INCORPORATION BY REFERENCE

This application is based upon and claims the benefit of priority from the corresponding Japanese Patent Application No. 2023-036431 filed on Mar. 9, 2023, the entire contents of which are incorporated herein by reference.

The present invention relates to an image forming apparatus that forms an image on paper, and a paper dust cleaning device.

BACKGROUND

Image forming apparatuses such as printers, copiers, facsimile machines, and multifunction peripherals equipped with these functions have a printing function of forming an image on a sheet of printing paper conveyed from a paper tray by a conveying roller. When the sheet of printing paper reaches an image forming position (image transfer position), an image is formed on the printing paper. In addition, before the printing paper reaches the image forming position, the image forming apparatus may control the operation of the conveying roller to perform correction operations such as skew correction and misalignment correction of the printing paper.

Moreover, conventionally, image forming apparatuses are known that include paper dust removing equipment that removes paper dust adhering to a conveying roller.

SUMMARY

An image forming apparatus according to one aspect of the present invention is an image forming apparatus including a paper dust cleaning device configured to remove paper dust adhering to a surface of a conveying roller that conveys a paper sheet in a predetermined conveying direction. The paper dust cleaning device includes a paper dust removing member configured to extend in an axial direction of the conveying roller and come in contact with a surface of the conveying roller; a holder formed in a long shape in the axial direction and configured to hold the paper dust removing member; and a holder support portion configured to hold the holder so that the paper dust removing member comes in contact with the surface of the conveying roller, and configured to support the holder so as to be movable in the axial direction.

A paper dust cleaning device according to another aspect of the present invention is a paper dust cleaning device configured to remove paper dust adhering to a surface of a conveying roller that conveys a paper sheet in a predetermined conveying direction. The paper dust cleaning device includes a paper dust removing member configured to extend in an axial direction of the conveying roller and come in contact with a surface of the conveying roller; a holder formed in a long shape in the axial direction and configured to hold the paper dust removing member; and a holder support portion configured to hold the holder so that the paper dust removing member comes in contact with the surface of the conveying roller, and configured to support the holder so as to be movable in the axial direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present invention will be described below with reference to the drawings as appropriate. The embodiments described below are merely examples of embodying the present invention, and do not limit the technical scope of the present invention.

Figure 1:
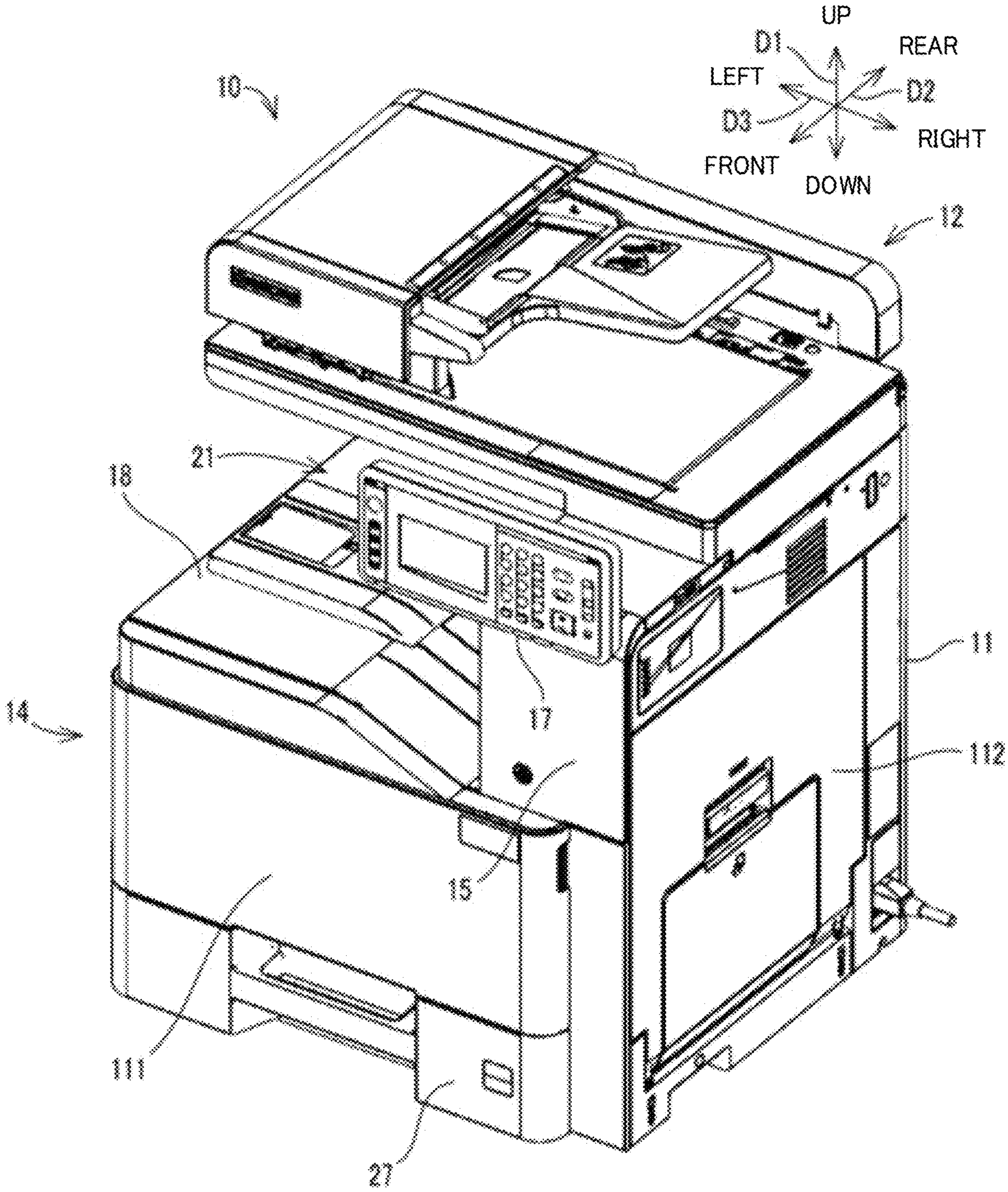
FIG. 1 is a perspective view showing a configuration of an image forming apparatus according to an embodiment of the present invention.
Figure 2:
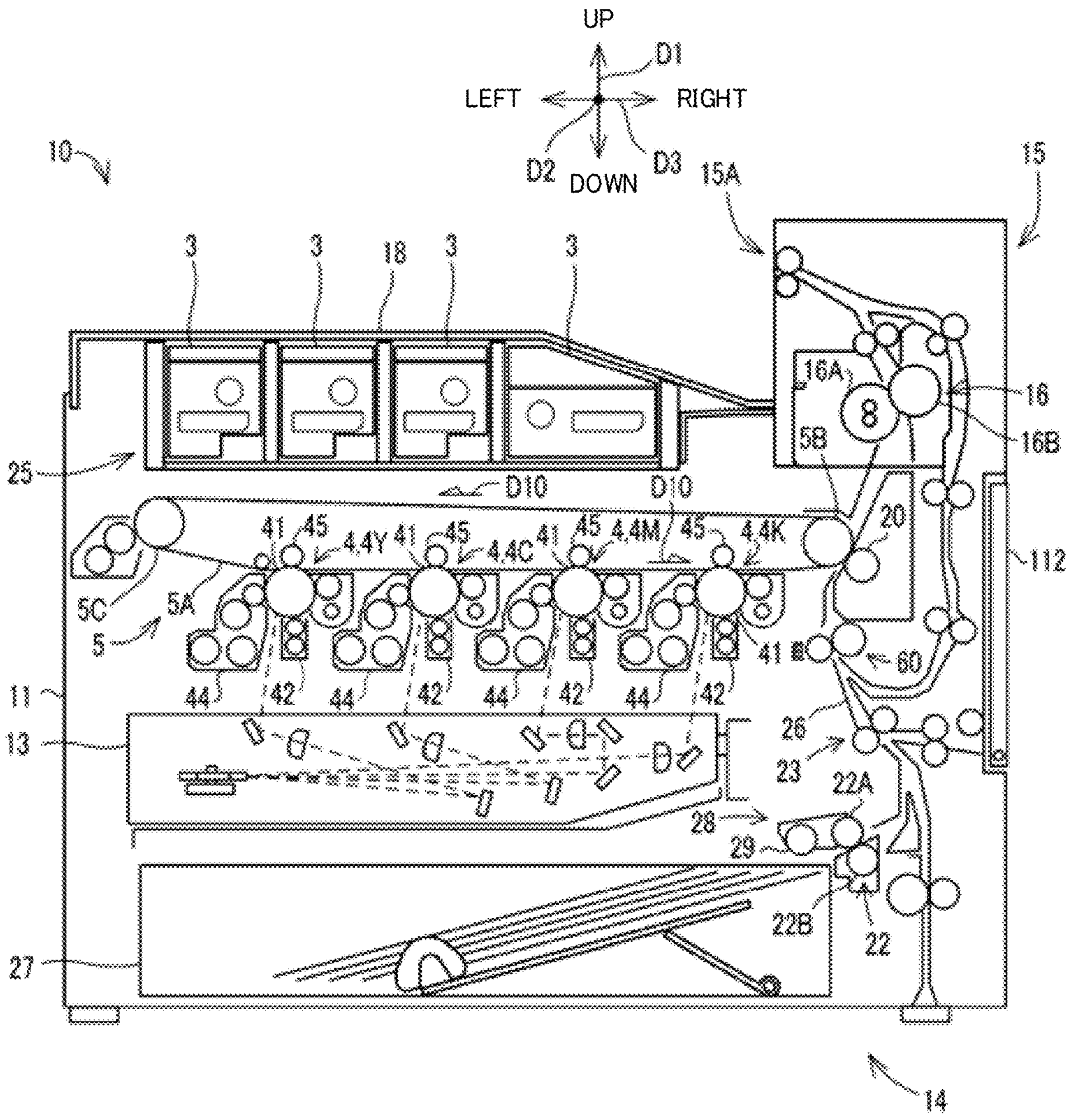
FIG. 2 is a schematic diagram showing an internal configuration of the image forming apparatus.

FIG. 1 is a perspective view showing a configuration of an image forming apparatus 10 according to an embodiment of the present invention. FIG. 2 is a schematic diagram showing an internal configuration of the image forming apparatus 10. In the following description, an up-down direction D1, a front-rear direction D2, and a left-right direction D3 are defined based on a state in which the image forming apparatus 10 is installed in a usable manner (the state in FIG. 1).

[Image Forming Apparatus 10]

As shown in FIG. 1, the image forming apparatus 10 is a multifunction peripheral capable of printing images on sheets such as printing paper, and includes various functions such as a print function, a copy function, a facsimile function, and a scan function. The image forming apparatus 10 is not limited to the above-mentioned multifunction peripheral, and may be any apparatus as long as the apparatus has a print function of printing an image on a conveyed sheet, and may be, for example, a printer, a copying machine, a FAX machine, or the like.

The image forming apparatus 10 includes an image reading portion 12 and an image forming portion 14. The image reading portion 12 performs a reading process of reading an image of a document, and is provided at an upper portion of the image forming apparatus 10. The image forming portion 14 performs a process of forming a color image based on an electrophotographic method, and is provided at a lower portion of the image forming apparatus 10. In addition, a sheet discharge portion 15 is provided on a right side of the image forming portion 14.

A discharge space 21 is provided above the image forming portion 14. The sheet discharge portion 15 vertically connects the image forming portion 14 and the image reading portion 12 while forming the discharge space 21 between the image forming portion 14 and the image reading portion 12.

The sheet discharge portion 15 discharges the sheet after image formation to the discharge space 21. A sheet discharge port 15A (see FIG. 2) is formed on a left side surface of the sheet discharge portion 15 on the discharge space 21 side. The sheet is discharged from the sheet discharge port 15A.

The image forming portion 14 includes a housing 11 as a main body of the apparatus. Inside the housing 11, various elements of the image forming portion 14 are provided. The housing 11 includes an exterior frame that covers the entire image forming portion 14 and an internal frame that supports each part of the image forming portion 14.

A front cover 111 (an example of a locking member or a cover member of the present invention) is provided on a front surface of the housing 11 to open the inside of the housing 11. The front cover 111 is rotatably supported to be able to rotate toward the front by a support shaft (not shown) provided at a left end portion of the front surface of the housing 11 and extending in the up-down direction D1.

FIG. 2 is a schematic diagram showing an internal configuration of the image forming apparatus 10. In FIG. 2, illustration of the image reading portion 12 is omitted.

The image forming portion 14 forms a color image on a sheet such as printing paper based on a so-called tandem method. As shown in FIG. 2, the image forming portion 14 includes a plurality of image forming units 4, an intermediate transfer unit 5, a laser scanning unit 13, a secondary transfer roller 20, a fixing device 16, a sheet tray 18, a sheet storing portion 27, a feeding unit 28, an operation display portion 17 (see FIG. 1), a sheet conveying path 26 (hereinafter abbreviated as the conveying path 26), a sheet conveying unit 23, a sheet correction unit 60, a toner container 3, and a control portion 30 (see FIG. 4) and the like.

As shown in FIG. 2, the sheet storing portion 27 is provided at a bottom portion of the image forming apparatus 10. The sheet storing portion 27 stores a sheet onto which an image is transferred by the image forming unit 4, and is formed, for example, in the shape of a tray with an open upper side. The sheet storing portion 27 is supported by the housing 11.

The feeding unit 28 takes out a plurality of sheets stacked in the sheet storing portion 27 one by one, and feeds the sheets toward the conveying path 26. The feeding unit 28 includes a pickup roller 29 and a feeding roller pair 22. The pickup roller 29 and the feeding roller pair 22 are provided above a right side portion of the sheet storing portion 27.

Figure 3:
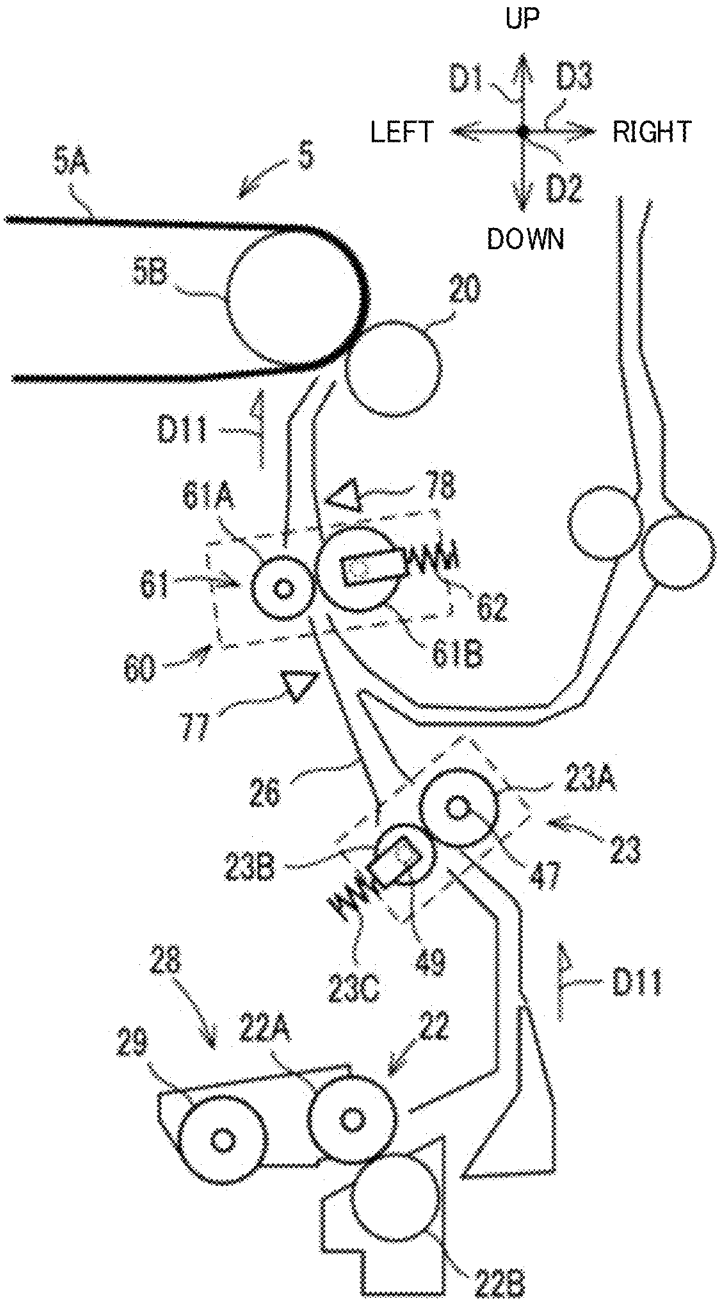
FIG. 3 is a schematic diagram showing a configuration around a sheet conveying path of the image forming apparatus.

FIG. 3 is a schematic diagram showing a configuration around the conveying path 26. The feeding roller pair 22 receives a rotational driving force from a conveying motor 51 (see FIG. 4) to convey the sheet toward a downstream side in the conveying direction D11. As shown in FIG. 3, the feeding roller pair 22 includes a drive roller 22A that rotates by a rotational driving force transmitted from the conveying motor 51, and a driven roller 22B that is driven and rotated by being in contact with the drive roller 22A. A drive transmission mechanism (not shown) that transmits the rotation of the drive roller 22A to a pickup roller 29 is provided between the pickup roller 29 and the drive roller 22A. The pickup roller 29 and the drive roller 22A are connected via the drive transmission mechanism. When the drive roller 22A is rotated by the conveying motor 51, the pickup roller 29 is also rotated in the same direction as the drive roller 22A by the drive transmission mechanism.

When an instruction signal to start a sheet feeding operation is input to the image forming apparatus 10, the pickup roller 29 and the feeding roller pair 22 are rotated by the rotational driving force of the conveying motor 51, and the sheet is fed from the sheet storing portion 27 to the conveyance path 26.

The conveying path 26 is a guide path that guides the sheet fed by the feeding roller pair 22 to the sheet discharge port 15A. As shown in FIG. 2, the conveying path 26 is curved upward from the feeding roller pair 22 and then extends upward, passing the secondary transfer roller 20 and reaching the sheet discharge port 15A.

As shown in FIG. 2, a side cover 112 is provided on a right side surface of the housing 11 to expose the conveying path 26 inside the housing 11. The side cover 112 is rotatably supported by a support shaft (not shown) provided at a lower end portion of the opening on the right side surface of the housing 11 and extending in the front-rear direction D2. A conveying guide of the right guide surface of the conveying path 26 is integrally provided on an inner surface side of the side cover 112. Therefore, when the side cover 112 is opened, the conveying path 26 is opened.

As shown in FIG. 3, the sheet conveying unit 23 and the sheet correction unit 60 are provided near the conveying path 26.

Figure 4:
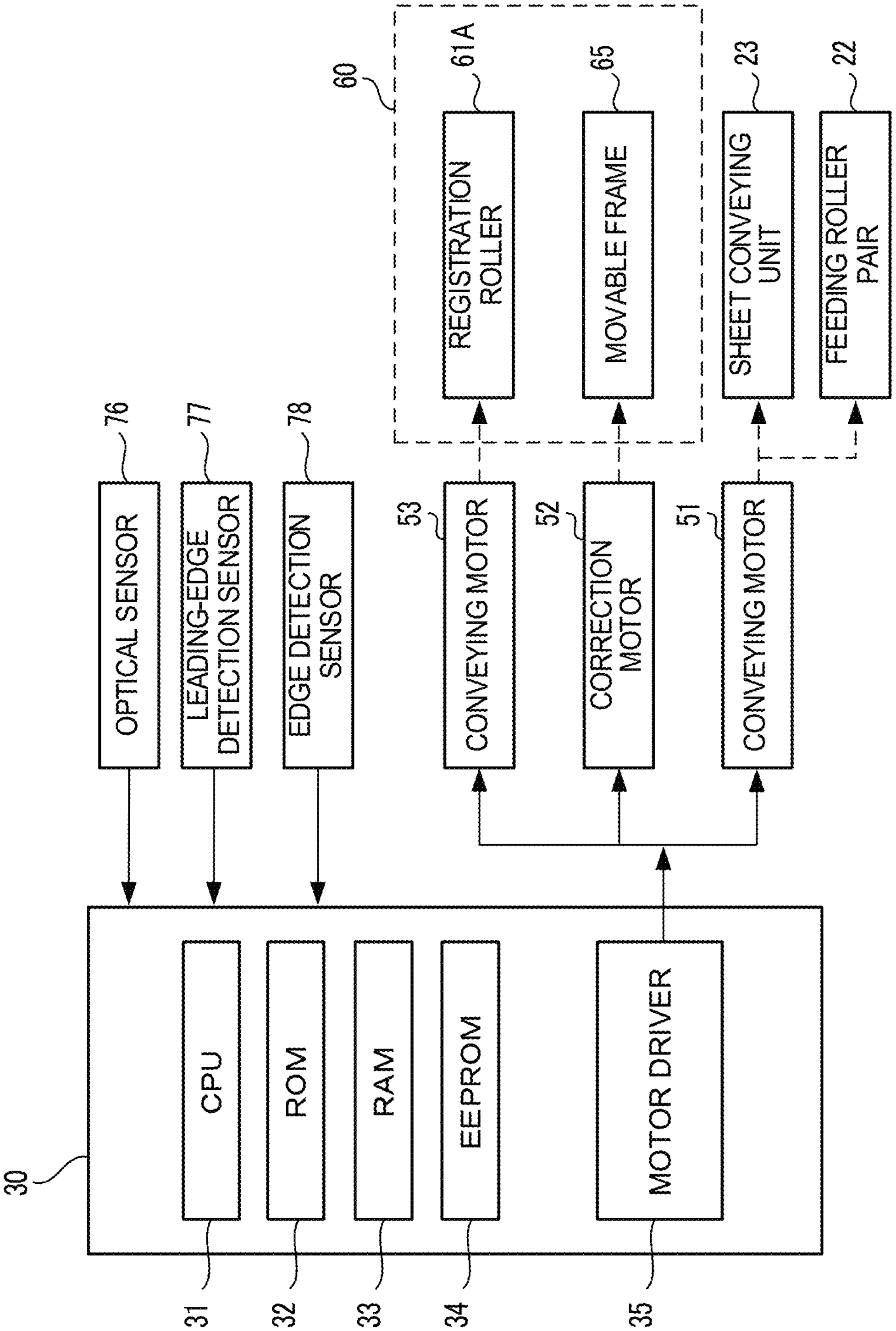
FIG. 4 is a block diagram showing the configuration of the image forming apparatus.

The sheet conveying unit 23 conveys the sheet toward a downstream side of a conveying direction D11 by receiving a rotational driving force from the conveying motor 51 (see FIG. 4). The sheet fed out to the conveying path 26 by the feeding unit 28 is conveyed toward the downstream side in the conveying direction D11 by the sheet conveying unit 23.

The sheet correction unit 60 is arranged on the conveying path 26 farther on the downstream side in the conveying direction D11 than the sheet conveying unit 23. The sheet correction unit 60 corrects the orientation and position of the sheet that is conveyed along the conveying path 26 at an angle with respect to the conveying direction D11, and conveys the sheet toward the downstream side in the conveying direction D11. The configuration of the sheet correction unit 60 will be described later.

As shown in FIG. 2, each image forming unit 4 is provided below the intermediate transfer unit 5. Each image forming unit 4 performs an image forming process to form a toner image on the surface of a transfer belt 5A based on image data input from the outside. The image forming units 4 are arranged side-by-side along the running direction of the transfer belt 5A (direction indicated by arrow D10). From the left side to the right side of the transfer belt 5A, an image forming unit 4Y for yellow, an image forming unit 4C for cyan, an image forming unit 4M for magenta, and an image forming unit 4K for black are arranged in a line in that order.

Each of the image forming units 4 includes a photoconductor drum 41, a charging device 42, a developing device 44, a primary transfer roller 45, and the like. The image forming unit 4Y forms a toner image on the surface of the photoconductor drum 41 using yellow toner. The image forming unit 4C forms a toner image on the surface of the photoconductor drum 41 using cyan toner, the image forming unit 4M forms a toner image on the surface of the photoconductor drum 41 using magenta toner, and the image forming unit 4K forms a toner image on the surface of the photoconductor drum 41 using black toner. A developing process of developing the toner image on the photoconductor drum 41 is performed by a developing device 44.

The intermediate transfer unit 5 includes a transfer belt 5A, a drive roller 5B, and a driven roller 5C. The transfer belt 5A is an annular belt member to which the toner images of each color formed on the photoconductor drums 41 of the image forming units 4 are transferred. The transfer belt 5A is provided above the photoconductor drums 41. The transfer belt 5A is rotatably supported by the drive roller 5B and the driven roller 5C that are provided apart from each other in the left-right direction D3. The transfer belt 5A is supported so as to span over the drive roller 5B and the driven roller 5C. When the surface of the transfer belt 5A passes between the photoconductor drums 41 and the primary transfer rollers 45, toner images are sequentially transferred to the transfer belt 5A from each photoconductor drum 41 in an overlapping manner.

The laser scanning unit 13 irradiates the photoconductor drum 41 of each image forming unit 4 with a laser beam based on input image data of each color. Thus, an electrostatic latent image is formed on each photoconductor drum 41.

The secondary transfer roller 20 is provided to face the drive roller 5B with the conveying path 26 extending vertically in between. The secondary transfer roller 20 performs a transfer process of transferring the toner image on the transfer belt 5A to the surface (transfer surface) of the sheet using a transfer potential applied to the secondary transfer roller 20. The sheet onto which the toner image has been transferred is conveyed to a fixing device 16.

The fixing device 16 heats the toner image transferred to the sheet and fixes the toner image to the sheet, and includes a heating roller 16A and a pressure roller 16B. The sheet conveyed to the fixing device 16 is conveyed while being sandwiched between the heating roller 16A and the pressure roller 16B. During conveying, heat is transferred from the heating roller 16A to the toner image transferred to the sheet, thereby heating the toner image. Thus, the toner image is fixed on the surface of the sheet. After that, the sheet is discharged onto the sheet tray 18 by the sheet discharge portion 15.

[Sheet Conveying Unit 23]

As shown in FIG. 3, the sheet conveying unit 23 includes a drive roller 23A that is rotationally driven by receiving a driving force from the conveying motor 51 (see FIG. 4), and a driven roller 23B arranged in a state so as to be in contact with the outer peripheral surface of the drive roller 23A. A conveying roller pair is achieved by the drive roller 23A and the driven roller 23B.

The drive roller 23A is fixed to a rotating shaft 47 extending in the front-rear direction D2 (hereinafter may be referred to as the width direction D2), and the rotating shaft 47 is rotatably supported by the internal frame of the housing 11. A driving force from the conveying motor 51 (see FIG. 4) is transmitted to the rotating shaft 47. The driving force of the conveying motor 51 is transmitted to the rotating shaft 47 via a transmission mechanism (not shown) such as a gear or a belt.

The driven roller 23B is biased toward the drive roller 23A side by a spring 23C with a predetermined elastic force (spring force). A bearing portion (not shown) that pivotally supports the rotating shaft 49 of the driven roller 23B is biased by the spring 23C. Thus, the driven roller 23B is pressed against the drive roller 23A. When the drive roller 23A is rotationally driven in this state, the driven roller 23B is driven.

As shown in FIG. 3, the conveying path 26 is provided with a leading-edge detection sensor 77. The leading-edge detection sensor 77 detects the leading edge of the sheet conveyed over the conveying path 26. In the conveying path 26, the leading-edge detection sensor 77 is provided farther on the downstream side in the conveying direction D11 than the sheet conveying unit 23, and farther on the upstream side in the conveying direction D11 than the sheet correction unit 60.

The leading-edge detection sensor 77 is, for example, a line sensor extending in the width direction D2. The line sensor includes a plurality of image sensors arranged in a row in the width direction D2. The leading-edge detection sensor 77 is connected to the control portion 30. The leading-edge detection sensor 77 outputs a detection signal including image data (density data) of the leading edge of the sheet to the control portion 30. After acquiring the detection signal from the leading-edge detection sensor 77, the control portion 30, based on the detection signal, determines whether the sheet has reached the detection position of the leading-edge detection sensor 77. Since this determination method is conventionally known, a detailed description thereof will be omitted.

Note that the leading-edge detection sensor 77 may be a reflective optical sensor provided at the center of the conveying path 26. The reflective optical sensor includes a light emitting element and a light receiving element, receives reflected light emitted from the light emitting element, and outputs a detection signal according to the amount of the received light. The control portion 30 may determine whether the conveyed sheet has reached the detection position of the leading-edge detection sensor 77 based on a change point of the detection signal sent from the reflective optical sensor.

As shown in FIG. 3, in the conveyance path 26, an edge detection sensor 78 is provided farther on the downstream side in the conveying direction D11 than the sheet correction unit 60.

The edge detection sensor 78 is arranged farther on the downstream side in the conveying direction D11 than the sheet correction unit 60 and farther on the upstream side in the conveying direction D11 than the image transfer position by the secondary transfer roller 20. The edge detection sensor 78 detects positions at both ends in the width direction D2 of the sheet that has passed through the sheet correction unit 60. The edge detection sensors 78 is a pair of line sensors provided at positions equally spaced from the center of the conveying path 26 to the outside in the width direction D2. Each line sensor is composed of a plurality of image sensors arranged in a row in the width direction D2. In the present embodiment, the edge detection sensor 78 is arranged so that the end portions of the sheet in the width direction D2 pass by each line sensor.

As shown in FIG. 4, the edge detection sensor 78 is connected to the control portion 30. The edge detection sensor 78 outputs a detection signal (density signal) including image data (density data) of both end portions of the sheet to the control portion 30. After acquiring the detection signal from the edge detection sensor 78, the control portion 30 determines the position of the sheet in the width direction D2 based on the detection signal. More specifically, the control portion 30 determines whether the sheet is located at the center in the width direction D2, whether the sheet has shifted in any direction in the width direction D2, and in a case where the sheet has shifted in the width direction D2, determines the amount shifted (lateral shift amount). Note that, since such a determination method is conventionally known, a detailed explanation thereof will be omitted.

[Sheet Correction Unit 60]

As shown in FIG. 3, the sheet correction unit 60 is provided on the conveying path 26 farther on the downstream side in the conveying direction D11 than the sheet conveying unit 23. More specifically, the sheet correction unit 60 is provided between the leading-edge detection sensor 77 and the edge detection sensor 78 in the conveying path 26.

Figure 5:
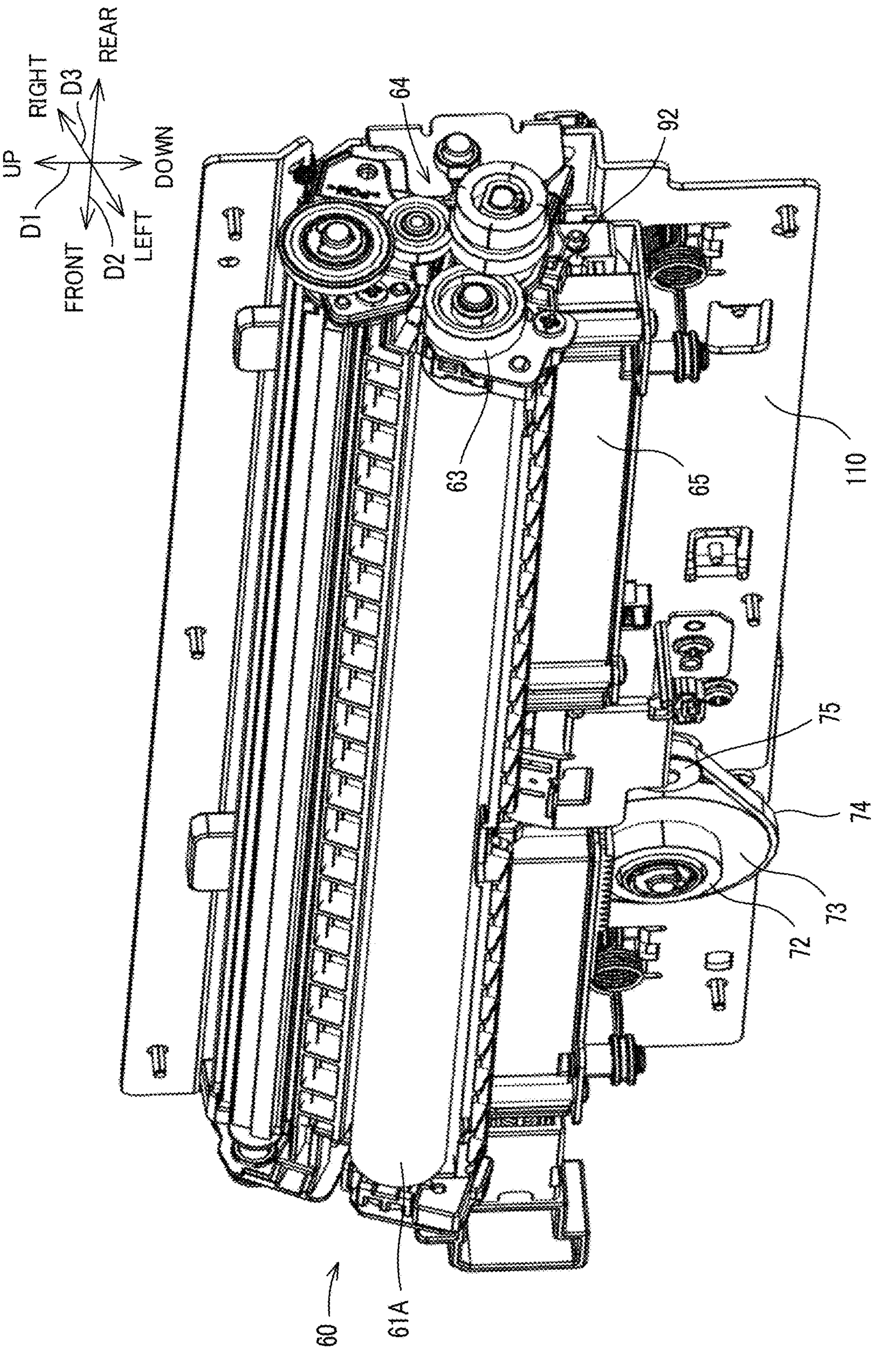
FIG. 5 is a perspective view showing a configuration around a sheet correction unit included in the image forming apparatus.
Figure 6:
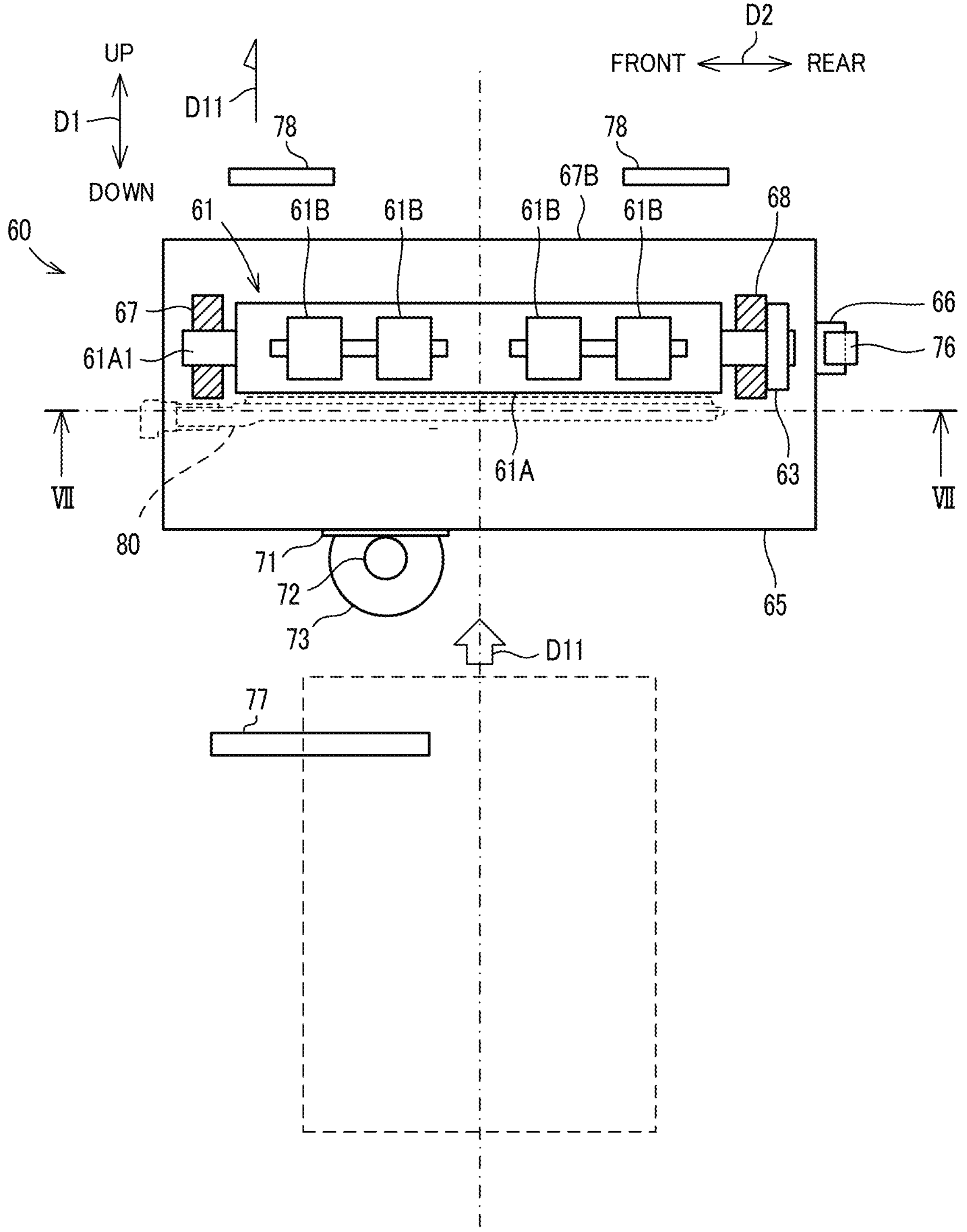
FIG. 6 is a schematic diagram showing a configuration of the sheet correction unit included in the image forming apparatus.

FIG. 5 is a perspective view showing the configuration around the sheet correction unit 60, and is a view of the sheet correction unit 60 as viewed from the diagonally rear right in FIG. 3. FIG. 6 is a schematic diagram showing the configuration of the sheet correction unit 60, and is a view of the sheet correction unit 60 as viewed from the right side in FIG. 3. Note that FIG. 5 shows a state in which the side cover 112 is removed and the registration roller 61A and the like is exposed.

In a case where the sheet conveyed by the sheet conveying unit 23 is shifted in the width direction D2, the sheet correction unit 60 returns the sheet to a predetermined center position and corrects the shift (lateral shift). More specifically, the sheet correction unit 60, during the process in which the sheet that has entered the sheet correction unit 60 is conveyed while being sandwiched between the registration roller 61A and the driven roller 61B, which will be described later, moves the sheet in a direction (direction opposite to the shift direction) in which the lateral shift is corrected by the amount of shift in the width direction D2 of the sheet. Thus, the lateral shift of the sheet in the width direction D2 is corrected.

As shown in FIG. 5, the sheet correction unit 60 is attached to a bracket 110 (an example of a frame support portion of the present invention) that is fixed to the housing 11. The sheet correction unit 60 includes a movable frame 65 (an example of a roller support frame of the invention), a registration roller 61A (an example of a conveying roller of the invention), a driven roller 61B, and a paper dust cleaning member 80 (example of a paper dust cleaning device of the present invention, see FIG. 6). Note that the paper dust cleaning member 80 is housed inside the movable frame 65, and thus the paper dust cleaning member 80 is not shown in FIG. 5.

The bracket 110 is fixed to the housing 11. The movable frame 65 is attached to the bracket 110. In the present embodiment, the movable frame 65 is formed in a long shape in the width direction D2. In addition, the movable frame 65 is supported by the bracket 110 of the housing 11 so as to be movable in the width direction D2. Note that as a support mechanism for supporting the movable frame 65 by the bracket 110 so as to be movable in the width direction D2, it is possible to apply, for example, a well-known slide rail mechanism composed of a rail and a guide, or other well-known support mechanisms.

As shown in FIG. 5, a rack 71 is formed at a lower end portion of the movable frame 65.

A driven pulley 73 having a pinion gear 72 is rotatably provided on the bracket 110. A pinion gear 72 is engaged with the rack 71. In addition, a drive pulley 75 is rotatably provided on the bracket 110. The drive pulley 75 is connected to the driven pulley 73 by a belt 74.

The bracket 110 is provided with a correction motor 52 (an example of a drive portion of the present invention, see FIG. 4) for supplying a rotational driving force to the drive pulley 75. A drive pulley 75 is attached to an output shaft of the correction motor 52. Therefore, when the correction motor 52 is rotationally driven, the drive pulley 75 receives a rotational driving force and rotates, and the rotational driving force is transmitted to the driven pulley 73 via the belt 74.

In the present embodiment, when the correction motor 52 is driven and controlled by the control portion 30 to rotate forward or rearward, the movable frame 65 slides and moves in either direction (forward direction or rearward direction) in the width direction D2.

As shown in FIG. 6, a protruding piece 66 that protrudes rearward is provided at a rear end portion of the movable frame 65. In addition, an optical sensor 76 capable of detecting the protruding piece 66 is provided on a rear side of the movable frame 65. The optical sensor 76 is attached to the housing 11 or the bracket 110, for example. The position of the protruding piece 66 is detected by the optical sensor 76. As will be described later, by moving the movable frame 65 to the rear side together with the registration roller 61A, the protruding piece 66 enters the detection area of the optical sensor 76 and is detected by the optical sensor 76. Thus, the movable frame 65 is arranged at a predetermined initial position. That is, the position of the movable frame 65 when the protrusion piece 66 is detected by the optical sensor is the initial position.

In the present embodiment, when the main power supply of the image forming apparatus 10 is turned ON from OFF, the control portion 30, based on the initial position where the protruding piece 66 is detected by the optical sensor 76, moves the movable frame 65 by a predetermined amount to one side (front side) in the width direction D2, and moves the movable frame 65 and the registration roller 61A to a predetermined home position.

The registration roller 61A is a roller member that is long in the width direction D2. The registration roller 61A is rotatably supported by the movable frame 65. The movable frame 65 is provided with a pair of support plates 67, 68 spaced apart from each other by a predetermined distance in the width direction D2. The predetermined interval is a length that allows the sheet to be conveyed between the pair of support plates 67, 68. The registration roller 61A is provided with rotating shafts 61A1 at both ends in the axial direction, and the rotating shafts 61A1 are rotatably supported by the support plates 67, 68.

An input gear 63 is attached to a rotating shaft 61A1 on one side (rear side) of the registration roller 61A. A gear transmission mechanism 64 including the input gear 63 is provided on a rear side of the sheet correction unit 60. A conveying motor 53 such as a stepping motor is provided on the bracket 110 or the housing 11. By inputting the rotational driving force of the conveying motor 53 to the gear transmission mechanism 64, the registration roller 61A is rotationally driven, and the sheet is conveyed in the conveying direction D11.

The driven roller 61B is rotatably supported by the conveying guide of the side cover 112. When the side cover 112 is closed with respect to the housing 11, the driven roller 61B contacts the outer peripheral surface of the registration roller 61A with a predetermined elastic force by the spring 62 (see FIG. 3).

A conveying roller pair 61 is achieved by the registration roller 61A and the driven roller 61B. This conveying roller pair 61 conveys the sheet toward the image transfer position on the downstream side in the conveying direction D11.

[Paper Dust Cleaning Member 80]

Figure 7:
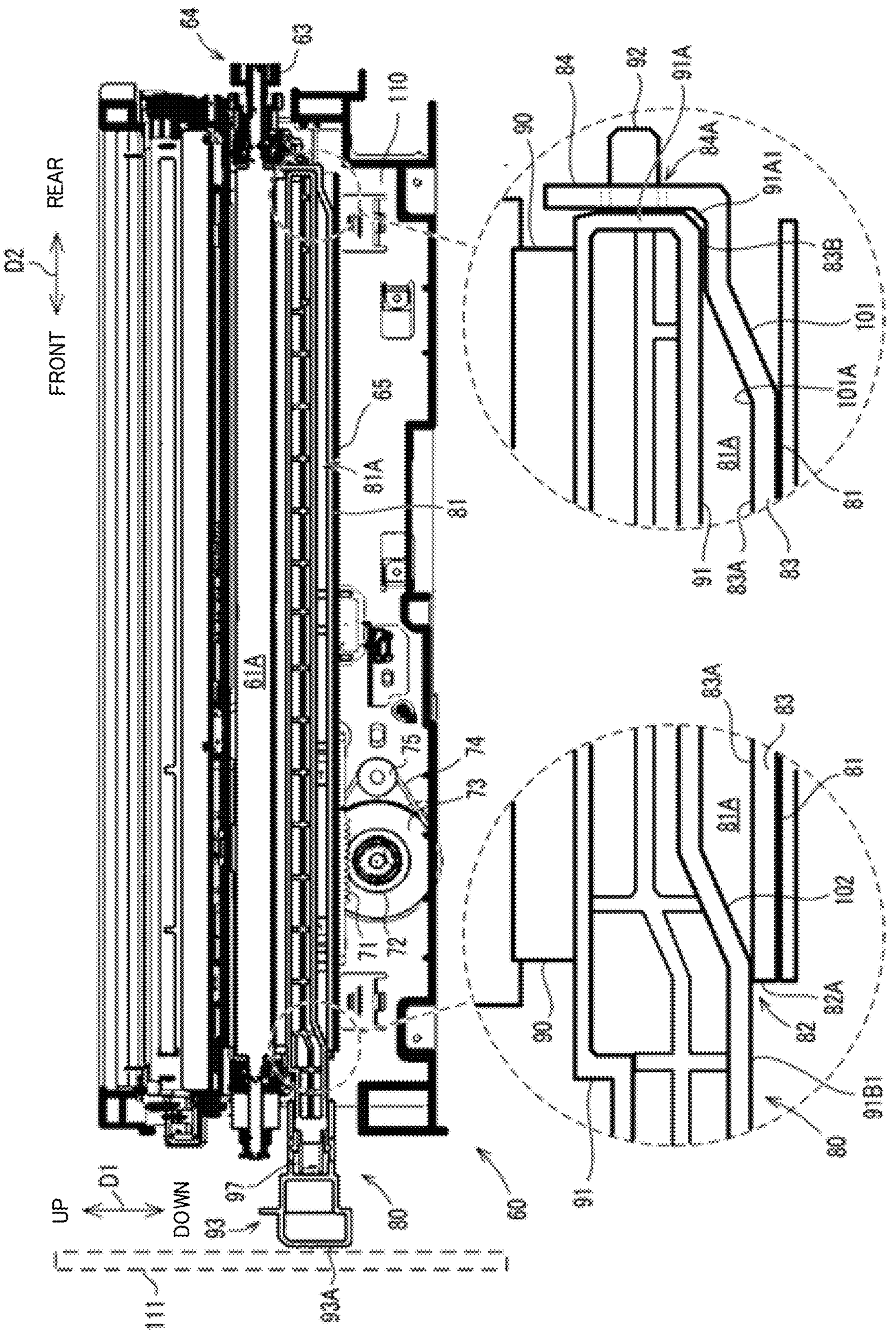
FIG. 7 is a cross-sectional view taken along cutting plane VII-VII in FIG. 6, and shows a cross-sectional structure of the sheet correction unit and a paper dust cleaning member included in the image forming apparatus.

FIG. 7 is a diagram showing a cross-sectional structure of the sheet correction unit 60 and the paper dust cleaning member 80. FIG. 8 to FIG. 11 are diagrams showing the structure of the paper dust cleaning member 80. The paper dust cleaning member 80 removes paper dust adhered to a surface of the registration roller 61A that conveys the sheet in the conveying direction D11, and is mounted to the movable frame 65 of the sheet correction unit 60 as shown in FIG. 7.

As shown in FIG. 7, the movable frame 65 is integrally provided with a storage portion 81 (an example of a holder support portion of the present invention) to which the paper dust cleaning member 80 is mounted. The storage portion 81 is configured to support the paper dust cleaning member 80 so as to be movable in the front-rear direction D2. Here, the front-rear direction D2 is a direction that coincides with the axial direction or longitudinal direction of the registration roller 61A. In the present embodiment, in a case where the paper dust cleaning member 80 is mounted to a mounting position set in the storage portion 81, the storage portion 81 holds the paper dust cleaning member 80 so that the paper dust removing portion 90 of the paper dust cleaning member 80 contacts the surface of the registration roller 61A. Note that FIG. 7 shows a state in which the paper dust cleaning member 80 is mounted at the mounting position and the paper dust removing portion 90 is in contact with the surface of the registration roller 61A.

The storage portion 81 is provided below the movable frame 65, and more specifically, is provided below the registration roller 61A. The storage portion 81 includes an insertion opening 82 formed on a wall surface on the front side of the movable frame 65, a support plate 83 extending rearward from a lower edge portion 82A of an insertion opening 82, and a back wall 84 located on a rear side of the storage portion 81 (an example of a contact portion of the present invention). A space defined by the support plate 83 and the surface of the registration roller 61A in a portion from the insertion opening 82 to the back wall 84 is a storage chamber 81A (storage space) in which the paper dust cleaning member 80 is stored.

When the paper dust cleaning member 80 is horizontally inserted into the insertion opening 82, a lower portion of the paper dust cleaning member 80 is slidably supported by an upper surface 83A of the support plate 83. That is, the paper dust cleaning member 80 is supported by the support plate 83 so as to be movable in the front-rear direction D2. When the paper dust cleaning member 80 is pushed rearward, a tip-end portion 91A of the paper dust cleaning member 80 comes into contact with the back wall 84, and the paper dust cleaning member 80 is arranged at the mounting position.

Figure 8:
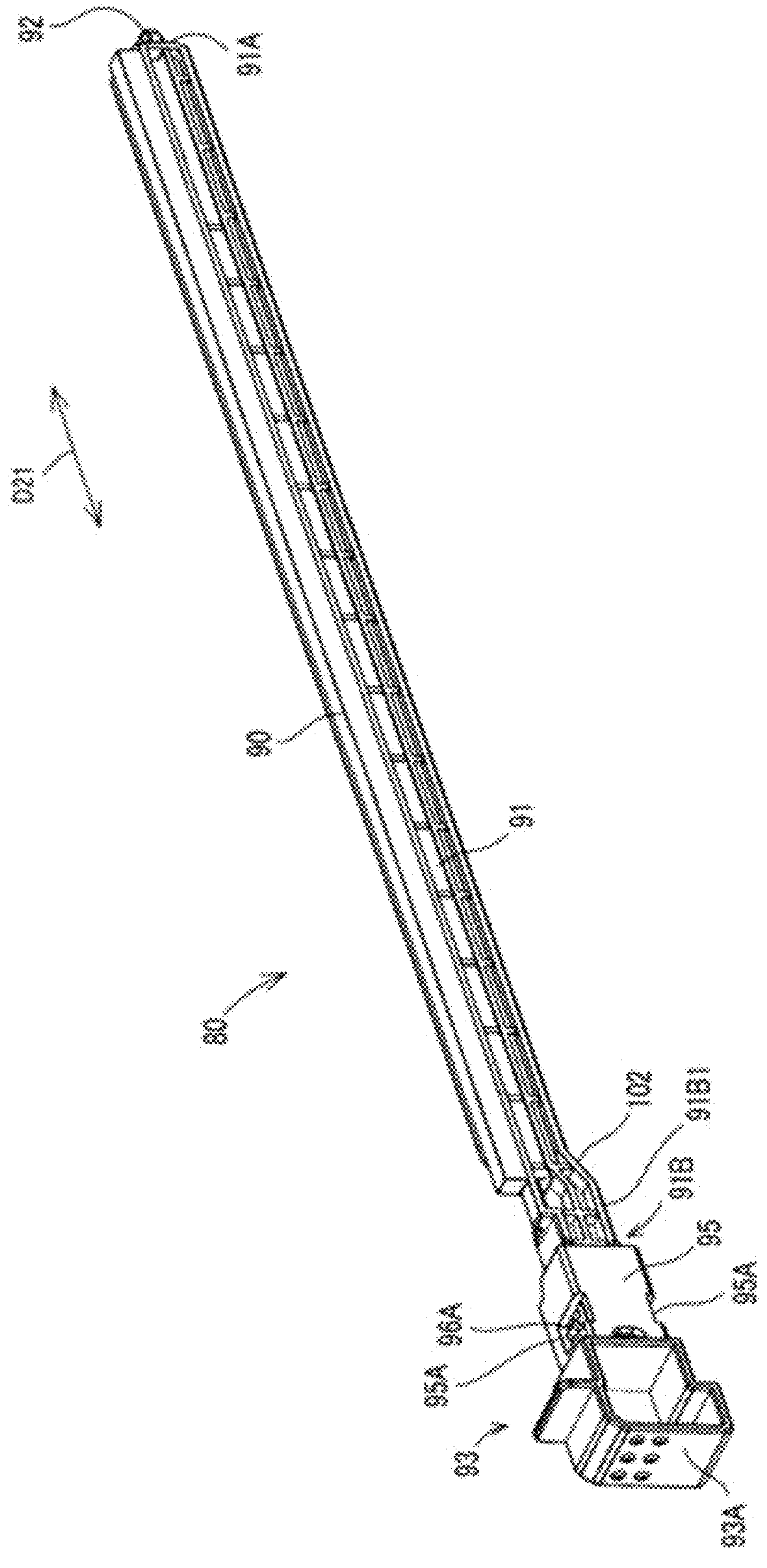
FIG. 8 is a perspective view showing a configuration of the paper dust cleaning member.
Figure 9:
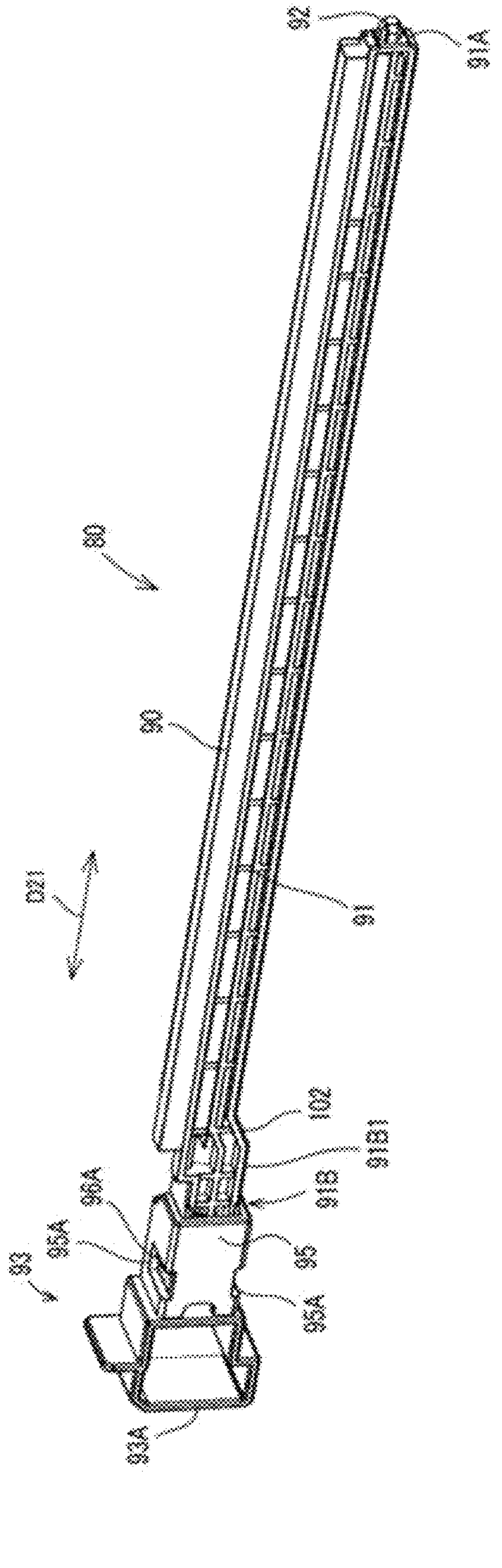
FIG. 9 is a perspective view showing the configuration of the paper dust cleaning member.

As shown in FIG. 8 and FIG. 9, the paper dust cleaning member 80 includes the paper dust removing portion 90 (an example of the paper dust removing member of the present invention) and a holder 91 that holds the paper dust removing portion 90. The paper dust cleaning device of the present invention is achieved by the above-described storage portion 81, the paper dust removing portion 90, and the holder 91.

Conventional paper dust removing members used for removing paper dust are formed of sponge-like or brush-like members. Therefore, in a case where a conveying roller such as the registration roller 61A moves in the axial direction, a conventional paper dust removing member may be deformed in the direction of movement, resulting in a decrease in paper dust removing ability. In addition, when the conveying rollers such as the registration roller 61A are frequently moved in the axial direction during skew correction or misalignment correction, the repetition of normal and deformed positions may damage or shorten the life span of the conventional paper dust removing member. Moreover, due to repeated changes in posture, there is a risk that removed paper dust existing on the surface of or inside of the conventional paper dust removing member may be scattered and adhere to conveying rollers such as the registration roller 61A or adhere to the paper.

With the image forming apparatus 10 of the present embodiment, it is possible to prevent deterioration of the paper dust removing portion 90 (paper dust removing member) due to the movement in the axial direction of the conveying rollers such as the registration roller 61A, and prevent scattering of the removed paper dust.

The holder 91 is a long bar-shaped member that is longer than the length in the axial direction of the registration roller 61A. The holder 91 is, for example, a resin molded product made of synthetic resin. The paper dust cleaning member 80 is mounted in the storage portion 81 so that the longitudinal direction D21 of the holder 91 and the axial direction of the registration roller 61A coincide.

The paper dust removing portion 90 is held on an upper surface of the holder 91. The paper dust removing portion 90 is, for example, a columnar member with a rectangular cross section, with one side surface being in contact with the upper surface of the holder 91. The paper dust removing portion 90 is made of, for example, a soft material, such as a sponge member, a brush-like member, a raised member, a nonwoven fabric member, a foam member, or the like. Specific examples of the paper dust removing portion 90 include, for example, polyurethane foam, felt, cork, and the like.

A protrusion 92 is formed on the tip-end portion 91A of the holder 91. A through hole 84A (see FIG. 7) into which the protrusion 92 can be inserted is formed in the back wall 84 of the storage portion 81. When the paper dust cleaning member 80 is mounted at the mounting position of the storage portion 81, the protrusion 92 is inserted into the through hole 84A. Thus, the tip-end portion 91A of the holder 91 is positioned in a direction perpendicular to the longitudinal direction D21. In addition, the tip-end portion 91A of the holder 91 is restricted by the back wall 84 so as not to move further rearward. Note that the protrusion length of the protrusion 92 is formed to be longer than the maximum correction amount in the width direction D2 by the sheet correction unit 60 (the maximum sliding amount of the movable frame 65).

Figure 10:
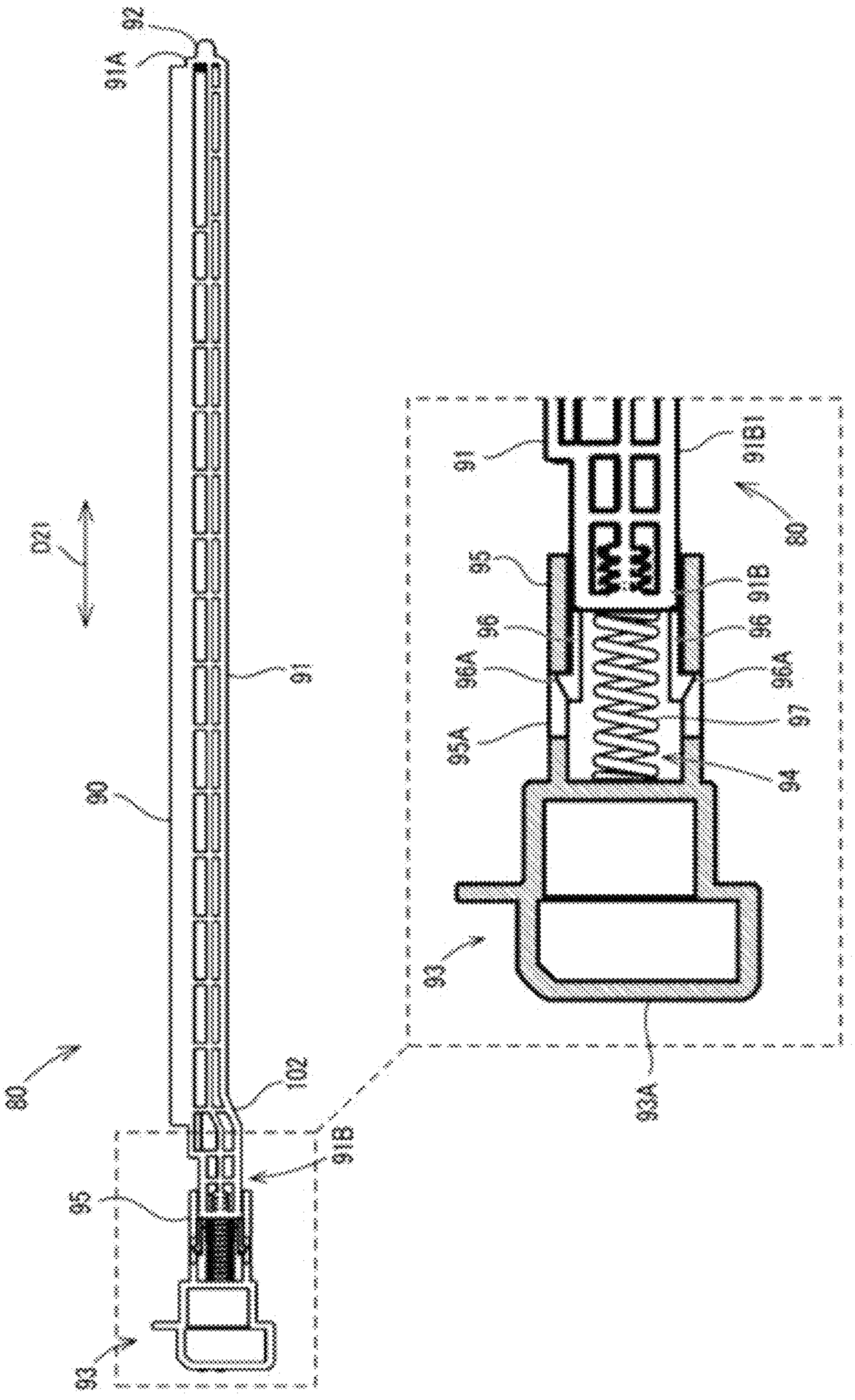
FIG. 10 is a cross-sectional view showing an internal structure of the paper dust cleaning member.

As shown in FIG. 10, a slide member 93 is attached to a base end portion 91B on one side (front side) in the longitudinal direction D21 of the holder 91. The slide member 93 is slidably attached to the base end portion 91B in the longitudinal direction D21 while forming a storage space 94 between the slide member 93 and an end surface of the base end portion 91B.

The slide member 93 has a cylindrical portion 95 that defines the storage space 94 therein. The base end portion 91B is inserted into an opening on one side of the cylindrical portion 95. A plurality of slot holes 95A that are long in the longitudinal direction D21 are formed in the outer peripheral surface of the cylindrical portion 95. The base end portion 91B is provided with a plurality of engaging hooks 96 that protrude from an end surface of the base end portion 91B. With the base end portion 91B inserted into the cylindrical portion 95, hook portions 96A at the tip ends of the engaging hooks 96 are inserted into the slot holes 95A. The slot holes 95A are longer in the longitudinal direction D21 than the hook portions 96A. Therefore, with the hook portions 96A engaged with the slot holes 95A, the slide member 93 can slide within a predetermined range with respect to the base end portion 91B.

A spring 97 (an example of the elastic member of the present invention) is attached to the storage space 94. The spring 97 provides an elastic force that biases the slide member 93 and the holder 91 in directions away from each other. The spring 97 is, for example, a coil spring, and is stored in the storage space 94 in a compressed state so as to generate the elastic force.

As shown in FIG. 7, the storage portion 81 is provided with a first inclined guide 101 (an example of the first guide portion of the present invention). In a case where the paper dust cleaning member 80 is pulled out to the front side from the mounted state in which the paper dust cleaning member 80 is mounted in the storage portion 81, the first inclined guide 101 guides the paper dust cleaning member 80 according to the pulling-out operation to a predetermined separated position (the position shown in FIG. 13). The separated position is a position where the paper dust cleaning member 80 is separated from the surface of the registration roller 61A to generate a gap between the surface of the registration roller 61A and the paper dust removing portion 90.

In addition, the first inclined guide 101 guides the paper dust cleaning member 80 from the separated position to a predetermined contact position (the position shown in FIG. 7) in the process of mounting the paper dust cleaning member 80 in the storage portion 81. The contact position is a position where the paper dust removing portion 90 approaches the surface of the registration roller 61A from the separated position and comes into contact with the surface of the registration roller 61A.

The first inclined guide 101 is integrally formed with the support plate 83. The first inclined guide 101 is provided at a rear end portion of the support plate 83. The first inclined guide 101 is an inclined surface inclined rearward and upward from an upper surface 83A of the support plate 83. The inclination angle of the first inclined guide 101 may be set to any angle, for example, within the range of 0 degrees to 45 degrees.

In the support plate 83, a flat support portion 83B is formed farther on the rear side than the first inclined guide 101. With the paper dust cleaning member 80 mounted to the storage portion 81, a lower end portion 91A1 of the tip-end portion 91A is supported by the flat support portion 83B.

In addition, as shown in FIG. 7, the holder 91 is provided with a second inclined guide 102 (an example of a second guide portion of the present invention). In a case where the paper dust cleaning member 80 is pulled out to the front side from the mounted state in which the paper dust cleaning member 80 is mounted in the storage portion 81, the second inclined guide 102 guides the paper dust cleaning member 80 according to the pulling-out operation to the above-mentioned separated position.

Moreover, the second inclined guide 102 guides the paper dust cleaning member 80 from the separated position to the contact position in the process of mounting the paper dust cleaning member 80 in the storage portion 81.

The second inclined guide 102 is integrally formed with the holder 91. The second inclined guide 102 is provided on the base end portion 91B side of the holder 91. The second inclined guide 102 is an inclined surface inclined rearward and upward from a lower surface 91B1 of the base end portion 91B. The angle of inclination of the second inclined guide 102 is set to the same angle as the angle of inclination of the first inclined guide 101.

Figure 12:
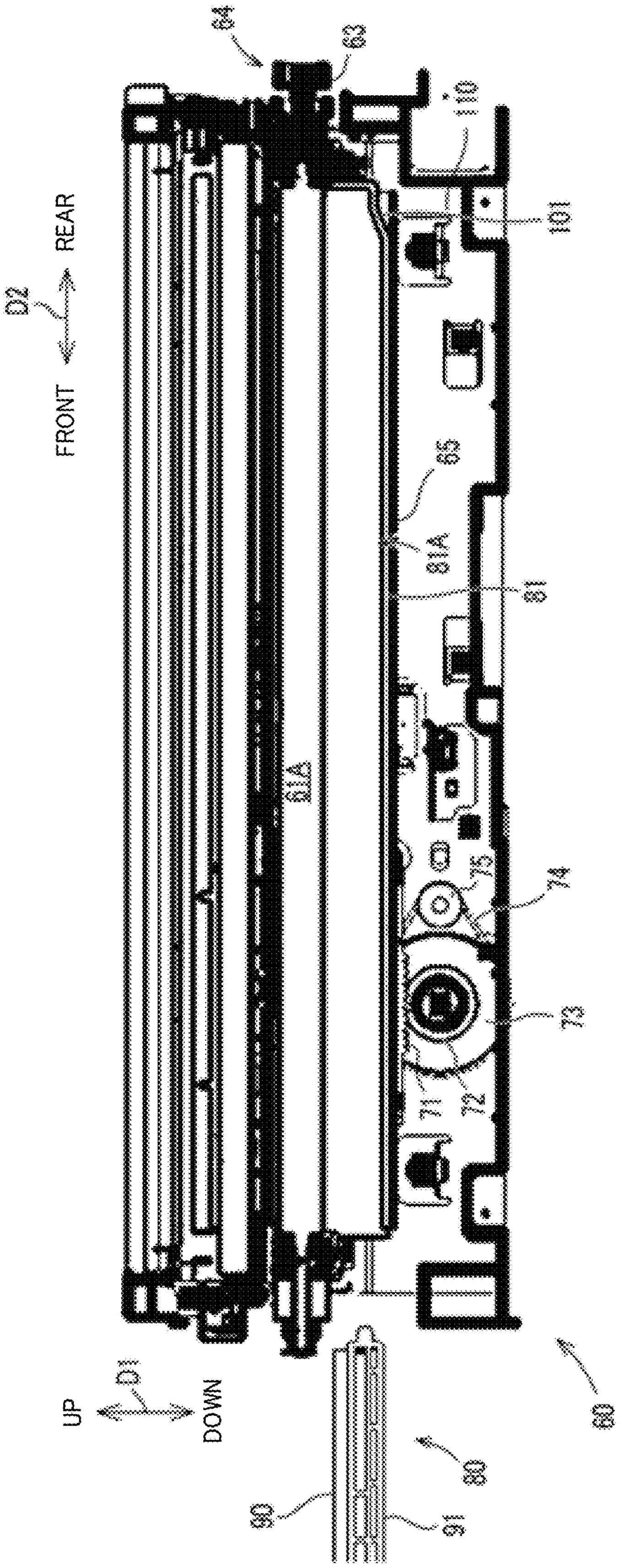
FIG. 12 is a diagram showing the sheet correction unit and the paper dust cleaning member, and shows a state before the paper dust cleaning member is inserted into the sheet correction unit.

The work of mounting the paper dust cleaning member 80 in the storage portion 81 is performed while the power supply of the image forming apparatus 10 is turned OFF. When the front cover 111 (see FIG. 1) of the image forming apparatus 10 is opened, the insertion opening 82 is exposed (see FIG. 12).

Figure 13:
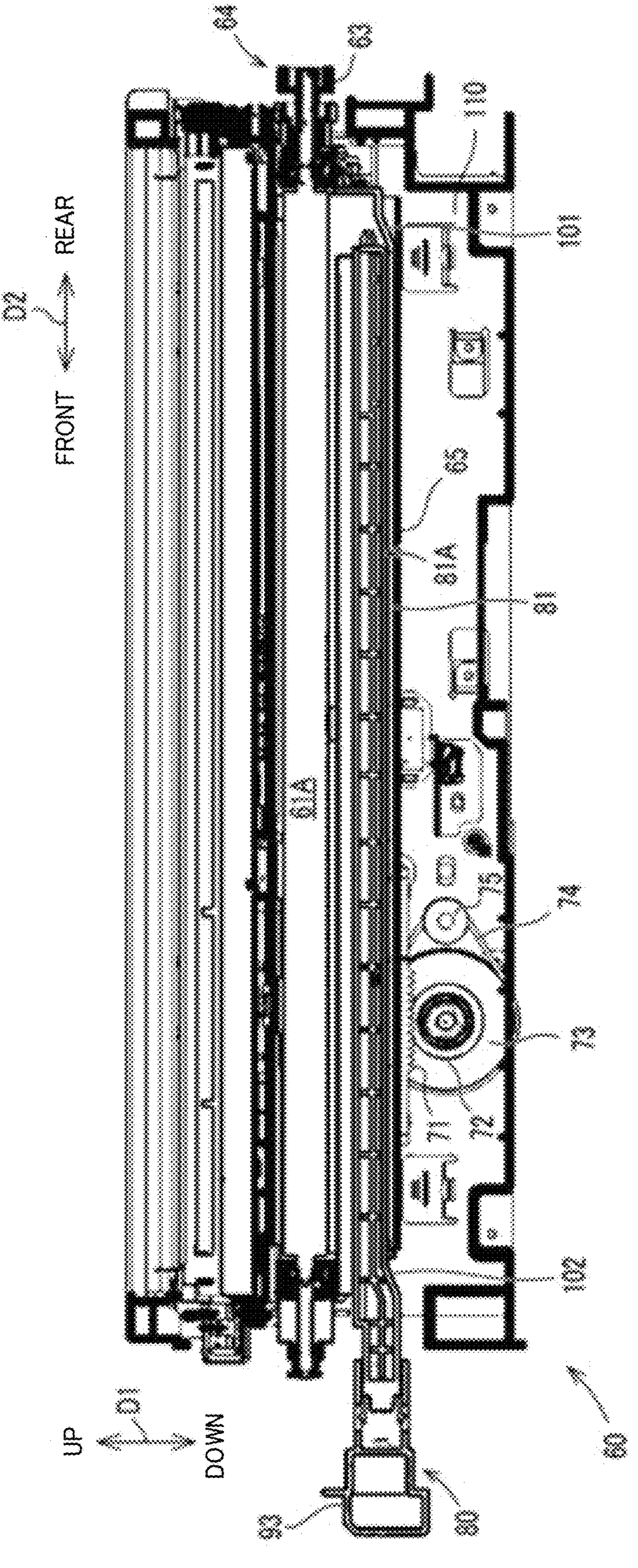
FIG. 13 is a diagram illustrating the sheet correction unit and the paper dust cleaning member, and shows a state in which the paper dust cleaning member is inserted to a back portion of the sheet correction unit.

When the paper dust cleaning member 80 is horizontally inserted into the insertion opening 82 and pressed toward the back side, the tip-end portion 91A reaches the vicinity of the back wall 84 (see FIG. 13). At this time, the lower end portion 91A1 of the tip-end portion 91A of the holder 91 is arranged at a lower end portion 101A of the first inclined guide 101. In this state, the second inclined guide 102 of the holder 91 has not yet come into contact with the lower edge portion 82A of the insertion opening 82.

Figure 14:
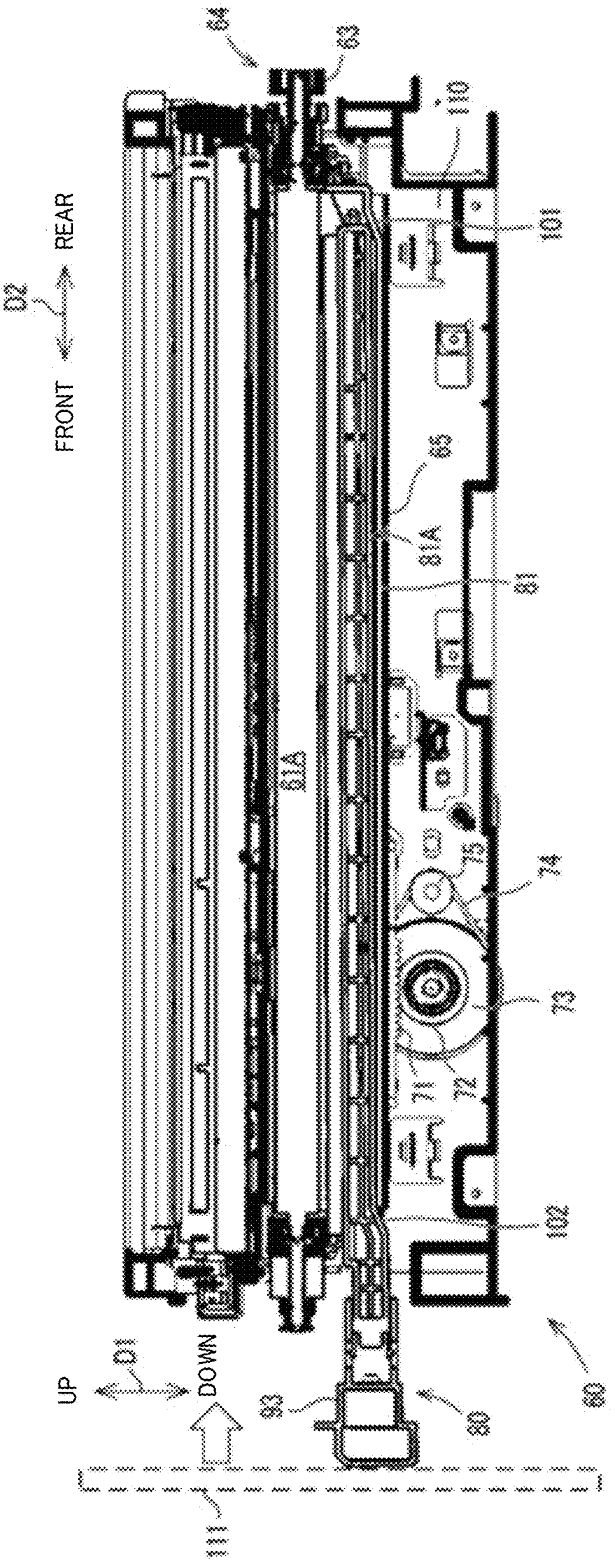
FIG. 14 is a diagram showing the sheet correction unit and the paper dust cleaning member, and shows a state in which the paper dust cleaning member is pressed to a specified mounting position after the paper dust cleaning member has been inserted.

After that, when the front cover 111 of the image forming apparatus 10 is closed, the back surface of the front cover 111 comes into contact with a front end portion 93A (see FIG. 7) of the slide member 93 during the closing process, and the slide member 93 is pushed to the back side (rear side) (see FIG. 7). Thus, the paper dust cleaning member 80 approaches the back side. As the paper dust cleaning member 80 approaches, the lower end portion 91A1 of the tip-end portion 91A of the holder 91 rides up on the slope of the first inclined guide 101, and the tip-end portion 91A moves up the first inclined guide 101 (see FIG. 14). Thus, the tip-end portion 91A is pushed up toward the registration roller 61A side. When the lower end portion 91A1 reaches the flat support portion 83B and the paper dust cleaning member 80 further moves toward the back side, the protrusion 92 is inserted into the through hole 84A of the back wall 84, and the tip-end portion 91A is inserted into the back wall. 84.

In the process of the lower end portion 91A1 of the tip-end portion 91A moving up the first inclined guide 101, the second inclined guide 102 of the holder 91 comes into contact with the lower edge portion 82A of the insertion opening 82. Thus, the base end portion 91B of the holder 91 is pushed up toward the registration roller 61A side, behind the tip-end portion 91A. Before the protrusion 92 is inserted into the through hole 84A of the back wall 84 and the tip-end portion 91A comes into contact with the back wall 84, a lower surface 91B1 of the base end portion 91B passes over the lower edge portion 82A and rides up on the upper surface 83A of the support plate 83. At this time, as shown in FIG. 7, the entire paper dust removing portion 90 comes in contact with the surface of the registration roller 61A with uniform pressure. When the back surface of the front cover 111 catches up with the paper dust cleaning member 80 and is moved further to the back side, the contact friction force between the paper dust removing portion 90 and the registration roller 61A causes the registration roller 61A and the movable frame 65 to move toward the initial position on the back side.

Figure 11:
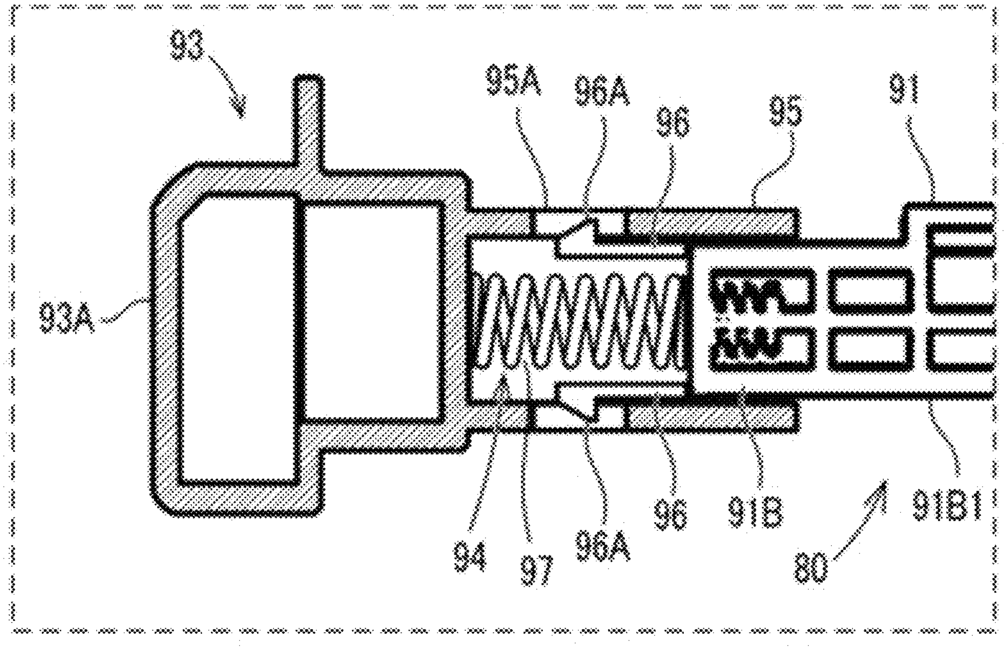
FIG. 11 is an enlarged cross-sectional view of a slide member of the paper dust cleaning member.

During the closing process in which the front cover 111 is closed, when the paper dust cleaning member 80 approaches the back side and the tip-end portion 91A comes into contact with the back wall 84, further movement of the holder 91 is stopped. In addition, the registration rollers 61A and the movable frame 65, which have been moved to the back side due to the contact friction force, also stop, and the registration rollers 61A and the movable frame 65 are arranged at the initial position. In this state, when the front cover 111 is further closed and locked to the housing 11, the mounting of the paper dust cleaning member 80 to the storage portion 81 is completed. By pushing the slide member 93 by the front cover 111 until the front cover 111 is locked to the housing 11, the slide member 93 moves in a direction approaching the base end portion 91B against the elastic force of the spring 97. At this time, as shown in FIG. 11, the hook portions 96A are inserted into the slot holes 95A; however, a state is maintained in which the hook portions 96A are not engaged with edge portions of the slot holes 95A.

When the paper dust cleaning member 80 is mounted in the storage portion 81, the elastic force with which the spring 97 biases the holder 91 is weaker than the contact friction force between the paper dust removing portion 90 and the registration roller 61A. That is, in the present embodiment, the spring 97 is applied such that the elastic force of the spring 97 is weaker than the contact friction force between the paper dust removing portion 90 and the registration roller 61A in the mounted state.

Note that the positioning mechanism of the present invention is configured by at least the front cover 111, the spring 97, the movable frame 65, and the flat support portion 83B.

The operation of removing the paper dust cleaning member 80 from the storage portion 81 is performed in a state in which the power supply of the image forming apparatus 10 is turned OFF.

When the front cover 111 (see FIG. 1) of the image forming apparatus 10 is opened, the pressing by the front cover 111 is released. At this time, the paper dust cleaning member 80 moves from the contact position shown in FIG. 7 to the position shown in FIG. 14 due to the force generated when the slide member 93 slides forward due to the elastic force of the spring 97. When the paper dust cleaning member 80 is pulled out a little, the paper dust cleaning member 80 is guided to the separated position shown in FIG. 13. At this time, the paper dust removing portion 90 of the paper dust cleaning member 80 and the surface of the registration roller 61A are separated by a predetermined gap. By pulling out the paper dust cleaning member 80 in this state, the paper dust cleaning member 80 can be pulled out from the storage portion 81 without bringing the paper dust removing portion 90 into sliding contact with the surface of the registration roller 61A.

[Control Portion 30]

The control portion 30 performs overall control of the image forming apparatus 10, controls the operation of the sheet conveying unit 23 and the operation of the sheet correction unit 60, and controls the conveying speed of each conveying roller pair. As shown in FIG. 4, the control portion 30 includes a CPU 31, a ROM 32, a RAM 33, a flash memory 34, a motor driver 35, and the like. The control portion 30 is an example of a movement control portion of the present invention. The control portion 30 is electrically connected to each motor 51, 52, 53 and each sensor 76, 77, 78 via a signal line or the like. Note that each of the motors 51, 52, and 53 is connected to a motor driver 35 of the control portion 30, and is driven and controlled by receiving individual control signals from the motor driver 35.

In the present embodiment, the control portion 30 operates the sheet correction unit 60 to correct the skew of a sheet that is conveyed in a skewed manner.

[Sheet Correction Process]

Figure 15:
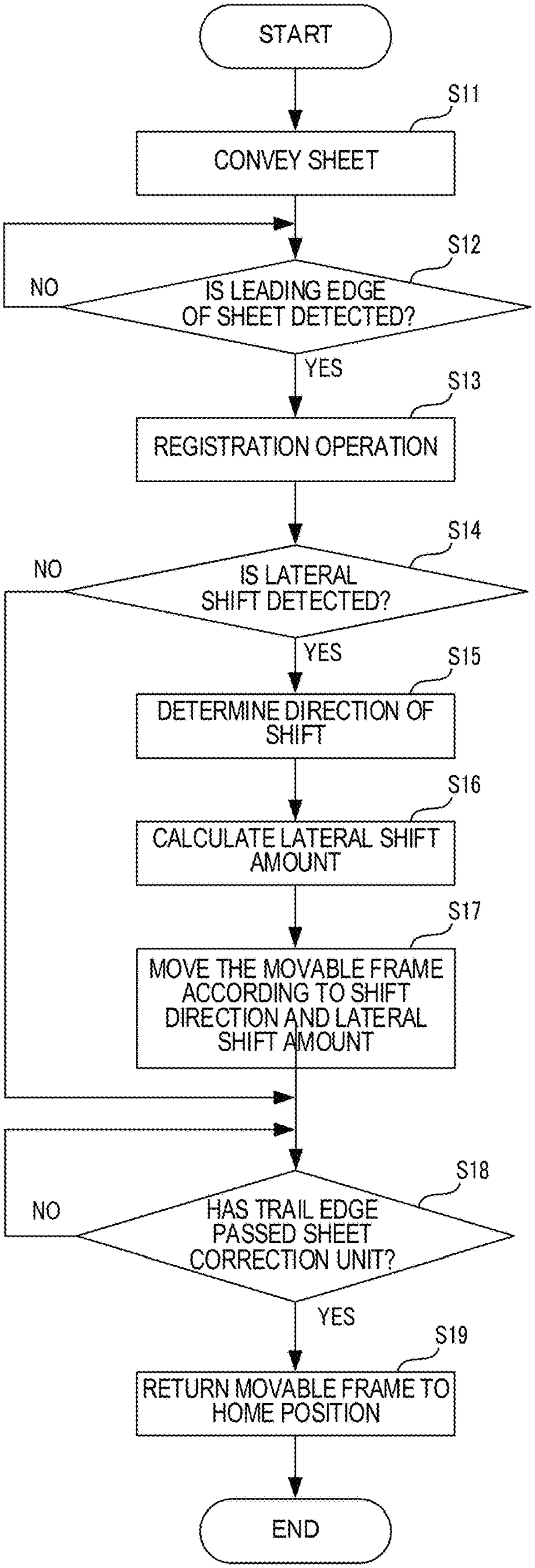
FIG. 15 is a flowchart illustrating an example of a procedure of a sheet correction process executed by a control portion included in the image forming apparatus.

Hereinafter, an example of the procedure of the sheet correction process executed by the control portion 30 will be described using the flowchart of FIG. 15.

Note that in the image forming apparatus 10, it is assumed that the movable frame 65 of the sheet correction unit 60 is arranged at the home position before the sheet correction process is performed.

When an instruction signal indicating the start of an image forming operation is input to the image forming apparatus 10, the image forming apparatus 10 starts an image forming process. First, the control portion 30 starts conveying a sheet (S11). More specifically, in the control portion 30, the motor driver 35 drives the conveying motors 51, 53, other motors (not shown), and the like, to rotate the drive roller 22A of the feeding roller pair 22, the pickup roller 29, the drive roller 23A of the sheet conveying unit 23, the discharge roller pair, and the like. Thus, the sheet is taken out from the sheet storing portion 27 and fed to the conveying path 26, and the sheet is conveyed in the conveying direction D11 by the feeding roller pair 22 and the sheet conveying unit 23.

In the next step S12, the control portion 30 determines whether the leading edge of the sheet has been detected based on the detection signal output from the leading-edge detection sensor 77. That is, the control portion 30, by the leading edge detection sensor 77, determines whether the leading edge of the sheet has passed the detection position.

When it is determined in step S12 that the leading edge of the sheet has been detected, the control portion 30 performs a registration operation to correct the skew of the sheet (S13). More specifically, the control portion 30 temporarily stops the registration roller 61A before the sheet enters the registration roller 61A. Thus, the leading edge of the sheet abuts against a nip portion between the registration roller 61A and the driven roller 61B, and the skew of the sheet is corrected. Note that after the registration operation, the registration roller 61A is driven again and the sheet is conveyed again.

When the leading edge of the sheet reaches the edge detection sensor 78, in the next step S14, the control portion 30, based on the detection signal from the edge detection sensor 78, determines whether the sheet has shifted in either direction (front side or rear side) in the width direction D2. Here, in a case where a shift (lateral shift) in the width direction D2 has occurred, the process proceeds to step S15, and the shift direction and lateral shift amount are determined. On the other hand, in a case where no lateral shift has occurred, the process proceeds to step S18.

In step S16, the control portion 30 calculates the direction of lateral shift of the sheet (shift direction) and the lateral shift amount. After that, in step S17, the control portion 30 slides the movable frame 65 of the sheet correction unit 60 in the direction of shift correction according to the lateral shift amount. More specifically, the control portion 30 drives and controls the correction motor 52 to move the movable frame 65 from the home position by the lateral shift amount in a direction opposite to the lateral shift direction of the sheet. Thus, the lateral shift of the sheet is corrected. After the sliding movement in step S17 is performed, the process proceeds to step S18.

In step S18, the control portion 30 determines whether the trailing edge of the sheet has passed through the sheet correction unit 60. When it is determined that the trailing edge of the sheet has passed the sheet correction unit 60, the control portion 30 returns the movable frame 65 to the home position (S19). When the process of forming an image on the sheet is completed, the control portion 30 stops driving each motor 51, 52, and 53, and ends the series of processes.

As described above, the image forming apparatus 10 of the present embodiment is provided with the paper dust cleaning member 80 having the paper dust removing portion 90, and the storage portion 81 that slidably supports the holder 91 of the paper dust cleaning member 80. Therefore, even in a case where the movable frame 65 is slid to correct the lateral shift and the registration rollers 61A are also moved in the same direction, the holder 91 and the paper dust removing portion 90 are slid in the same direction by following the slide of the registration rollers 61A. Thus, deterioration and damage to the paper dust removing portion 90 due to the axial sliding of the registration roller 61A is reduced, and shortening of the life of the paper dust removing portion 90 is prevented. In addition, the paper dust removing portion 90 does not deform as the registration roller 61A slides in the axial direction, and thus the removed paper dust inside the paper dust removing portion 90 is prevented from scattering.

In addition, when power to the image forming apparatus 10 is OFF, the paper dust cleaning member 80 is inserted into the storage chamber 81A of the storage portion 81 from the insertion opening 82, and the paper dust cleaning member 80 is mounted to the mounting position at the back of the storage portion 81, and then during the mounting process, the paper dust removing portion 90 and the surface of the registration roller 61A come into contact with each other. At this time, the force in the insertion direction of the paper dust cleaning member 80, due to contact friction, acts as a force to move the registration roller 61A and the movable frame 65 to the rear side. Thus, the registration roller 61A and the movable frame 65 move to the rear side due to the contact friction. As a result, when the paper dust cleaning member 80 is mounted, the movable frame 65 can be placed at the initial position.

In addition, the first inclined guide 101 is provided in the storage portion 81 and the second inclined guide 102 is provided in the holder 91, and thus by simply opening the front cover 111 and pulling out the paper dust cleaning member 80 a little, the paper dust removing portion 90 of the paper dust cleaning member 80 can be separated from the surface of the registration roller 61A. In this case, contrary to when the paper dust cleaning member 80 is mounted, the base end portion 91B of the holder 91 is separated from the surface of the registration roller 61 by the second inclined guide 102 before the tip-end portion 91A, after which the tip-end portion 91A is separated from the surface of the registration roller 61 by the first inclined guide 101, and then the paper dust cleaning member 80 is guided to the separated position. Thus, during the process of pulling out the paper dust cleaning member 80, the paper dust removing portion 90 no longer comes into sliding contact with the surface of the registration roller 61A, and thus the removed paper dust in the paper dust removing section 90 is prevented from adhering again to the surface of the registration roller 61A.

Note that in the embodiment described above, a configuration was described in which when the paper dust cleaning member 80 is mounted, the tip-end portion 91A is pushed up toward the registration roller 61A by the first inclined guide 101 before the base end portion 91B, then following the tip-end portion 91A, the base end portion 91B is pushed up toward the registration roller 61A side by the second inclined guide 102, and when pulling out the paper dust cleaning member 80, the base end portion 91B is separated from the surface of the registration roller 61 by the second inclined guide 102 before the tip-end portion 91A, and then following the base end portion 91B, the tip-end portion 91A separates from the surface of the registration roller 61 by the first inclined guide 101; however, the present invention is not limited to such a configuration. For example, as a support mechanism for the paper dust cleaning member 80, a configuration may be applied in which the inclination angles of the inclined surfaces of the first inclined guide 101 and the second inclined guide 101 are the same angle, and when pulling out the paper dust cleaning member 80, in response to the paper dust cleaning member 80 being moved from the mounting position toward the insertion opening 82 side, the paper dust cleaning member 80 is moved in parallel to the separation position.

In addition, in the above-described embodiment, a configuration was described in which the front cover 111, as an example of a locking member, is closed in the housing 11, thereby holding the slide member 93 in a pressed state; however, the present invention is not limited to such a configuration. Apart from the front cover 111, a cover member that closes and locks the insertion opening 82 may be provided on the movable frame 65. Moreover, instead of the cover member, for example, a locking mechanism may be provided that locks the slide member 93 in a state where the paper dust cleaning member 80 is mounted to the storage portion 81.

Furthermore, in the above-described embodiment, the paper dust cleaning member 80 for removing paper dust from the registration roller 61A is illustrated; however, for example, the paper dust cleaning member 80 may be applied to removing paper dust from conveying rollers other than the registration roller 61A, such as the drive roller 22A and the drive roller 23A. For example, in a case where play is provided in the axial direction of the rotating shafts of the drive rollers 22A, 23A, the drive rollers 22A, 23A may move in the axial direction due to vibrations generated during operation of the image forming apparatus 10. In this case as well, the holder 91 and the paper dust removing portion 90 can be moved in the same direction following the axial movement of the drive rollers 22A, 23A.

In addition, in the above-described embodiment, the image forming apparatus 10 is illustrated as an embodiment of the present invention; however, the present invention may also be viewed as a paper dust cleaning device configured by the storage portion 81, the paper dust removing portion 90, and the holder 91.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising a paper dust cleaning device configured to remove paper dust adhering to a surface of a conveying roller that conveys a sheet of paper in a predetermined conveying direction;

the paper dust cleaning device comprising:

a paper dust removing member configured to extend in an axial direction of the conveying roller and come in contact with a surface of the conveying roller;

a holder formed in a long shape in the axial direction and configured to hold the paper dust removing member;

a holder support portion configured to hold the holder so that the paper dust removing member comes in contact with the surface of the conveying roller, and configured to support the holder so as to be movable in the axial direction; and an elastic member configured to apply an elastic force in the axial direction to the holder, the force being weaker than contact friction force between the surface of the conveying roller and the paper dust removing member.

2. The image forming apparatus according to claim 1, further comprising:

a roller support frame configured to rotatably support the conveying roller; wherein the holder support portion is integrally formed with a roller support frame, and includes an insertion opening into which the holder is inserted, a support plate configured to extend along the axial direction from a lower end portion of the insertion opening and define a storage space on an upper side in which the holder is stored; and a contact portion provided on a back side of the storage space and against which a tip-end portion of the holder comes into contact.

3. The image forming apparatus according to claim 2, wherein the holder includes a slide member attached to a base end portion on one side in a longitudinal direction of the holder, the slide member forming a space between the slide member and the base end portion and being capable of sliding in the longitudinal direction;

the elastic member is provided between the slide member and the base end portion so as to generate the elastic force; and the paper dust cleaning device further comprising a locking member configured to press the slide member toward the back of the storage space against the elastic force to hold the holder in the storage space in a state in which the holder is inserted into the storage space.

4. The image forming apparatus according to claim 3, wherein the locking member is a cover member that closes the insertion opening, and in a case where the insertion opening is closed by the cover member, a back surface of the cover member comes into contact with the slide member and presses the slide member toward a back side of the storage space.

5. The image forming apparatus according to claim 4, wherein the insertion opening is arranged on a predetermined side surface of the image forming apparatus; and the cover member, together with closing the insertion opening, also closes an opening on the side surface of the image forming apparatus.

6. The image forming apparatus according to claim 2, further comprising:

a frame support portion configured to support the roller support frame so as to be movable in a width direction perpendicular to the conveying direction;

a drive portion configured to supply a drive force in the width direction to the roller support frame;

a positioning mechanism configured to move the roller support frame and position the roller support frame at a predetermined initial position; and a movement control portion configured to control the drive portion to move the roller support frame from the initial position to a predetermined home position when the image forming apparatus is energized; wherein the positioning mechanism is configured such that when power to the image forming apparatus is turned OFF, a force in an insertion direction of the holder generated when the holder is inserted into the storage space is transferred from the holder to the roller support frame via the conveying roller and moves the roller support frame to the initial position.

7. A paper dust cleaning device that removes paper dust adhered to a surface of a conveying roller that conveys a paper sheet in a predetermined conveying direction, comprising:

a paper dust removing member configured to extend in an axial direction of the conveying roller and come in contact with a surface of the conveying roller;

a holder configured to be long in the axial direction and hold the paper dust removing member;

a holder support portion configured to hold the holder so that the paper dust removing member comes in contact with a surface of the conveying roller, and support the holder so as to be movable in the axial direction; and an elastic member configured to apply an elastic force in the axial direction to the holder, the force being weaker than contact friction force between the surface of the conveying roller and the paper dust removing member.

* * * * *